United States Patent [19]

Hildebolt et al.

[11] 4,175,486
[45] Nov. 27, 1979

[54] PROTEIN TEXTURIZATION

[75] Inventors: William M. Hildebolt, Mickleton; Murray T. Hundt, Maple Shade, both of N.J.

[73] Assignee: Campbell Soup Company, Camden, N.J.

[21] Appl. No.: 868,451

[22] Filed: Jan. 10, 1978

Related U.S. Application Data

[62] Division of Ser. No. 645,613, Dec. 31, 1975, Pat. No. 4,095,001.

[51] Int. Cl.$^2$ .............................................. A23C 3/02
[52] U.S. Cl. ....................................... 99/483; 264/12
[58] Field of Search ................. 99/483, 352, 353, 355, 99/484, 646 R; 264/202, 121, 12; 426/656

[56] References Cited

U.S. PATENT DOCUMENTS

| | | | |
|---|---|---|---|
| 3,861,287 | 1/1975 | Manser | 99/483 |
| 4,038,432 | 7/1977 | Hildebolt | 264/12 X |
| 4,039,691 | 8/1977 | Hildebolt | 264/12 X |
| 4,099,455 | 7/1978 | Wenger | 99/483 |

Primary Examiner—Edward J. McCarthy

Attorney, Agent, or Firm—Schuyler, Birch, McKie & Beckett

[57] ABSTRACT

A bland protein product having a texture and mouth feel simulating animal meat is prepared from a dough-like mixture of proteinaceous material and water. The proteinaceous material can comprise relatively low protein content blends or even single ingredients such as soy flour. The process comprises continuously extruding the protein dough in the form of a relatively thin sheet of semi-rigid protein material into a confined treating zone while simultaneously subjecting the thin sheet in the extrusion die to externally applied heat to texturize both surfaces of the sheet before it enters into the confined zone. In the confined zone a stream of heated gas is directed at the thin sheet of surface-texturized protein to break off the leading segment of the sheet and further to propel the segments through the confined zone where additional texturization takes place. Finally, the protein segments are passed through a back pressure means at the end of the confined zone, and recovered in usable form. Apparatus for performing this process is also disclosed.

11 Claims, 22 Drawing Figures

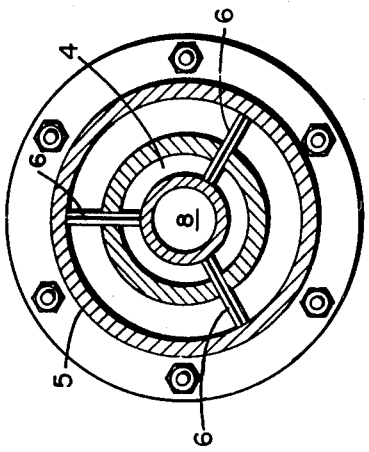
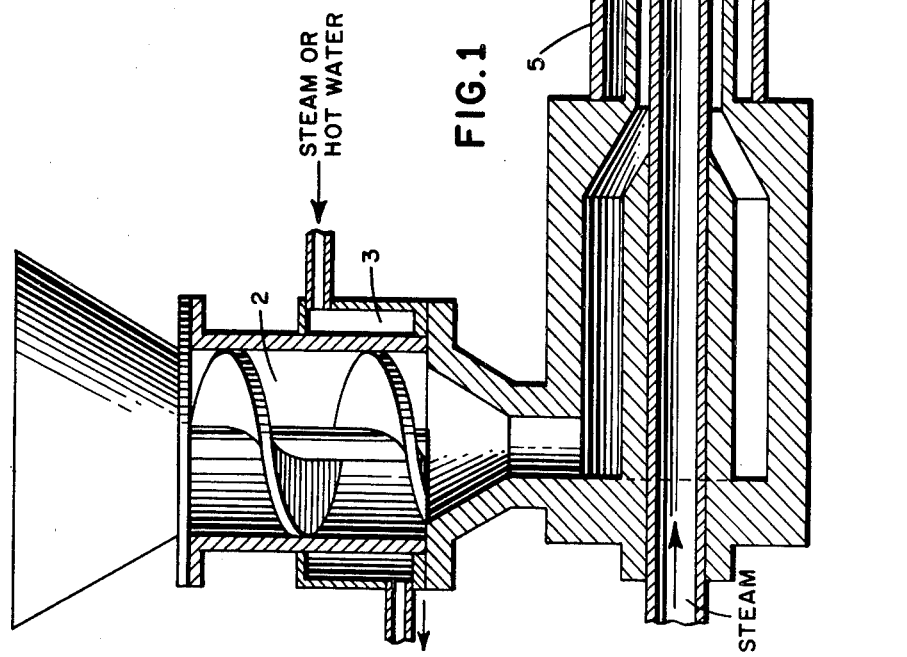

PROTEIN TEXTURIZATION

This is a division of application Ser. No. 645,613, filed Dec. 31, 1975, now U.S. Pat. No. 4,095,001.

BACKGROUND OF THE INVENTION

1. Field of the Invention

This invention relates to the treatment of untextured protein materials to form a product possessing the fibrous texture and mouth feel properties of animal meat.

2. Description of the Prior Art

The food industry has spent much effort over a span of many years and has expended large sums of money in an attempt to utilize non-meat proteins, such as those derived from vegetables, as additives to or substitutes for animal meat products. It long has been recognized that the ever-increasing worldwide food shortage could be in material part obviated if only such relatively inexpensive materials could be converted into products so closely approximating the naturally occurring food material that public acceptance would be achieved. One of the major roadblocks encountered by the industry has been the inability to impart the natural and accustomed chewy, fibrous texture to vegetable protein materials. Animal meat products inherently possess a texture giving them a definite "mouth feel" which is clearly recognized and strongly preferred. Vegetable proteins in their natural state generally take the form of amorphous powders which, despite their unquestioned nutritive value, possess mouth feel characteristics wholly unacceptable to the consumer as a meat substitute. Moreover, vegetable proteins normally are characterized by objectionable "beany" flavors which the industry has been unable to remove or mask.

In recent years a number of processes and apparatus have been developed for treating vegetable protein material to produce a bland texturized product. None of these processes, however, has achieved any substantive measure of commercial success.

The first generation of these prior art techniques involved the wet spinning process disclosed in Boyer, U.S. Pat. No. 2,730,447. This process produces a fibrous product by extruding a plurality of fine streams of an aqueous solution of protein into a chemical coagulating bath. The protein coagulates into fine fibers which are collected together and treated to form an edible textured protein product. The wet spinning process suffers from a number of drawbacks in addition to its general failure to produce an adequately textured product as discussed above. The equipment employed to perform this process is extremely sophisticated for the food industry and represents a very high initial cost problem. Adding further to the economic infeasibility of the product produced by the wet spinning process is the expensive starting materials which must be employed. Moreover, product uniformity is difficult to achieve due to the general complexity of the process and the numerous parameter control problems presented.

The second generation technique advanced in this area is the extrusion cooking process disclosed in Atkinson, U.S. Pat. No. 3,488,770, in which a protein mass is subjected to severe physical working at an elevated temperature and thereafter extruded at an elevated temperature and pressure through an orifice into a medium of lower pressure and temperature. This process suffers from high equipment costs and is extremely energy intensive due to the extreme temperature and pressure requirements. In addition, the product produced by extrusion cooking has a very low density which swells up in water to give a "spongy" texture. Moreover, the product contains objectionable flavor notes in addition to the "beany" flavor originally present in the starting materials which are apparently imparted to the product by the severe processing steps. Other patents demonstrating the current state of the art in respect to the extrusion texturizing approach include Hale, U.S. Pat. No. 3,447,929; Jenkins, U.S. Pat. No. 3,496,858; Anker, U.S. Pat. No. 3,684,522; Strommer, U.S. Pat. No. 3,778,522; Lang, U.S. Pat. No. 3,800,053; Atkinson, U.S. Pat. No. 3,812,267; and Yang, U.S. Pat. No. 3,814,823.

The third generation of development in the protein texturization involves the use of steam as the texturizing medium. Exemplary of this approach are Strommer, U.S. Pat. Nos. 3,754,926 and 3,863,019 which treat either finely divided protein particles or slurries with steam and Heusdens U.S. Pat. No. Re. 28,091 which employs a steam treatment of protein slurry following complex hydration steps. Products produced by these processes also possess the general problems of poor texture and flavor discussed above. In addition, the product has low density problems similar to the second generation extrusion cooked products in that on hydration they tend to be very soft. The product is also extremely friable.

Other attempted solutions by the art include the cooking and shaping of a protein dough disclosed in McAnelly, U.S. Pat. No. 3,142,571, and the heat coagulation of undenatured protein disclosed in Rusoff, U.S. Pat. No. Re. 27,790.

Notwithstanding the veritable plethora of prior art attempts to satisfactorily texturize vegetable proteins—no one to date has made any really substantial progress toward the desired goal. The present absence from the market of any commercially accepted consumer products based on vegetable protein demonstrates clearly that the problems involved simply have not been solved. Indeed, those meat analog products which have found their way to the supermarket shelves generally have been met with little or no consumer acceptance and have generally been withdrawn. Especially in the United States, where consumer preferences rather than nutritional values often dictate the fate of food products, a successful texturized vegetable protein material simply must possess taste and mouth feel characteristics similar to natural meat. In addition, the prior art processes generally have employed such complex apparatus and procedures that initial equipment and operating costs have made protein analog products economically unattractive to manufacturers, despite the relatively inexpensive nature of the raw product.

Given the ever-increasing fears of worldwide famine and the diminishing availability of animal meat protein products, it is clear that an inexpensive, consumer-acceptable, high protein food product based on texturized vegetable proteins is urgently needed.

BRIEF SUMMARY OF THE INVENTION

It is the object of the present invention to provide a process and apparatus for texturizing protein which fulfills the need left by the prior art texturizing processes.

More specifically, it is an object of the present invention to provide a process and apparatus for producing thin discrete segments of relatively dense protein material having a fibrous texture simulating that the natural meat.

It is a further object of the present invention to provide a process and apparatus which will produce a bland flavored protein product.

Another object of the present invention is to provide a process and apparatus which will produce a retort stable protein product.

It is also an object of this invention to provide a texturizing process and apparatus which will produce such a product at a much lower cost due to lower initial equipment costs and lower energy requirements.

It is also an object of the present invention to provide a high quality texturized protein product from relatively inexpensive, low protein starting materials.

Accordingly, the method of the present invention comprises continuously extruding a relatively thin sheet of semi-rigid protein material through a die means while simultaneously texturizing both surfaces of said thin sheet as it passes through said die means by externally applying heat to both surfaces of said sheet, passing said extruded sheet directly into a confined treating zone while simultaneously directing a heated gaseous stream at said extruded sheet as it enters said confined treating zone to break off the leading segment of said extruded sheet, said gaseous stream further propelling said segments through said confined treatment zone; and recovering the texturized protein segments.

The present invention further provides apparatus for texturizing protein which comprises die means for extruding a continuous, relatively thin sheet of semi-rigid protein material; means for externally applying heat to both surfaces of said thin sheet as it passes through said die means to effect surface texturization of said thin sheet; means defining a confined treating zone communicating with said die means; means for directing a heated gaseous stream at said extruded thin sheet as it enters said confined zone to break off the leading segment of said extruded sheet; and means for recovering said texturized protein material.

BRIEF DESCRIPTION OF THE DRAWINGS

FIG. 1 represents a schematic of one embodiment of the apparatus of the present invention.

FIG. 2 is a sectional view taken along line 2—2 of FIG. 1 showing the slitting means at the discharge end of the die assembly.

DETAILED DESCRIPTION OF THE INVENTION

Figure 3:
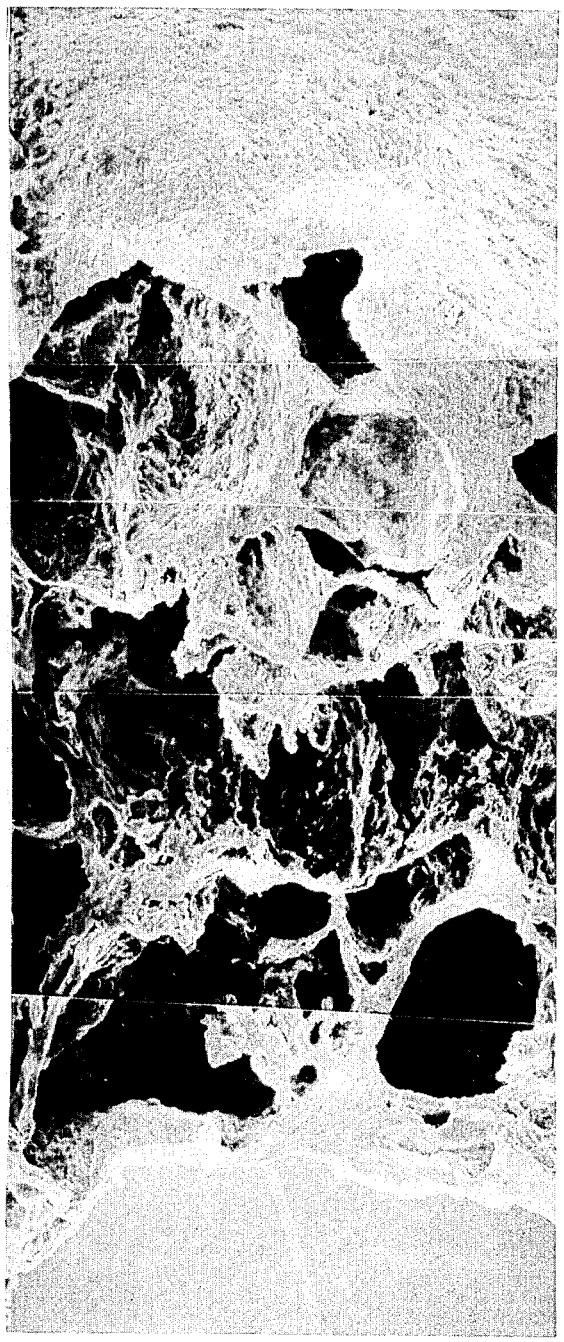
FIG. 3 is a photomicrograph of a section of the product produced by the present invention, observed at 50X.
Figure 4A:
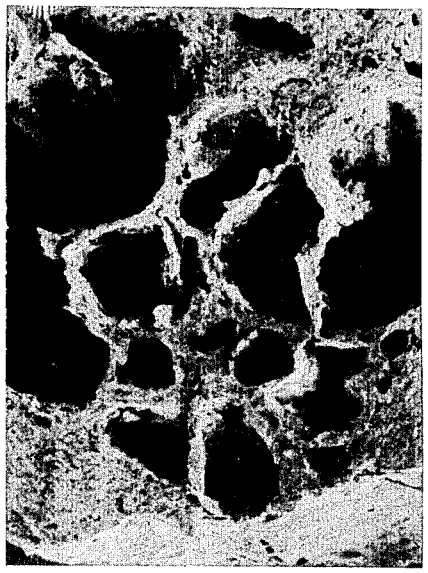
FIG. 4 represents a series of photomicrographs of an interior section of the product produced by the present invention; 4a is at 25X; 4b at 50X; 4c at 100X; 4d at 300X; 4e at 500X; 4f at 1000X; and 4g at 1500X.
Figure 4B:
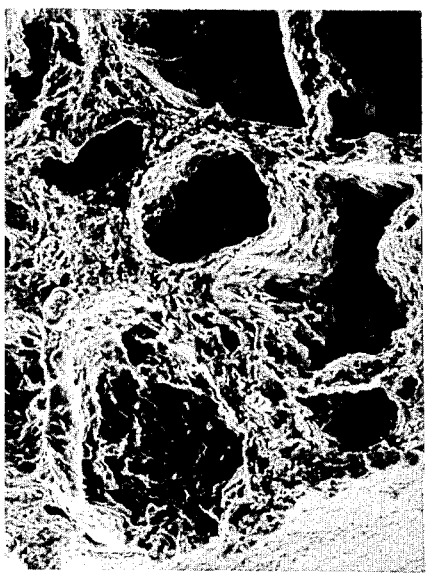
Figure 4C:
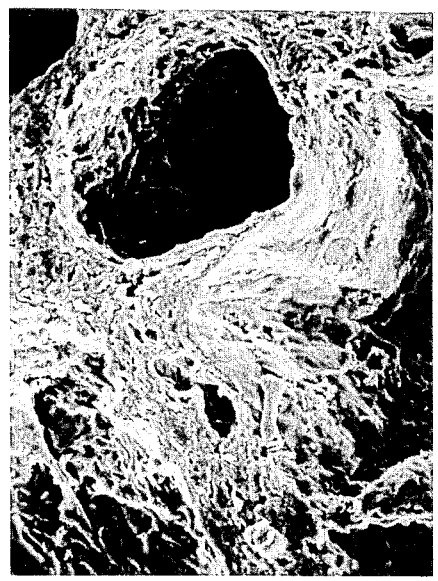
Figure 4D:
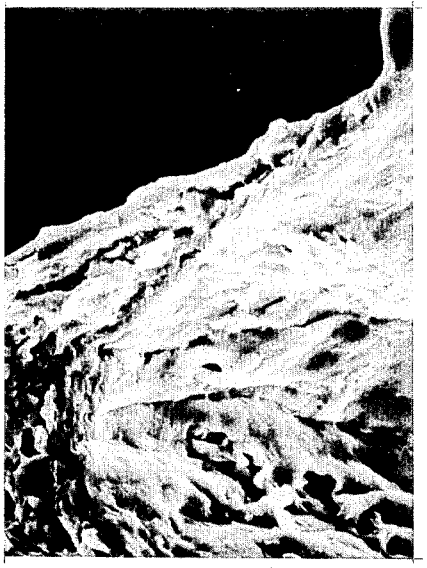
Figure 4E:
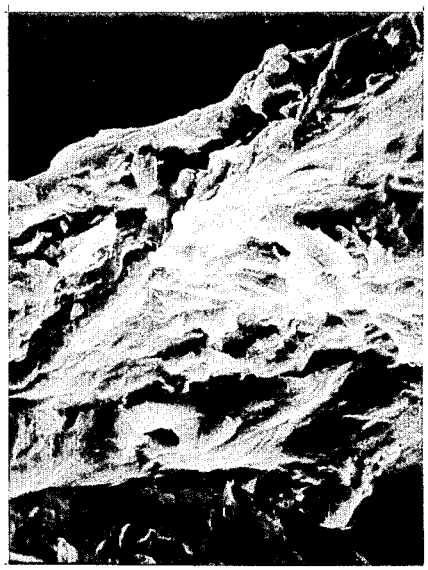
Figure 4F:
Figure 4G:
Figure 5A:
FIG. 5 represents a series of photomicrographs of an exterior section; 5a is at 50X; 5b at 100X; 5c at 300X; 5d at 500X; 5e at 1000X; and 5f at 1500X.
Figure 5B:
Figure 5C:
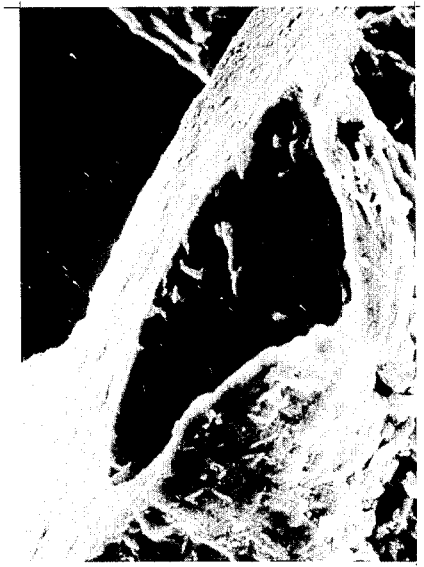
Figure 5D:
Figure 5E:
Figure 5F:
Figure 6A:
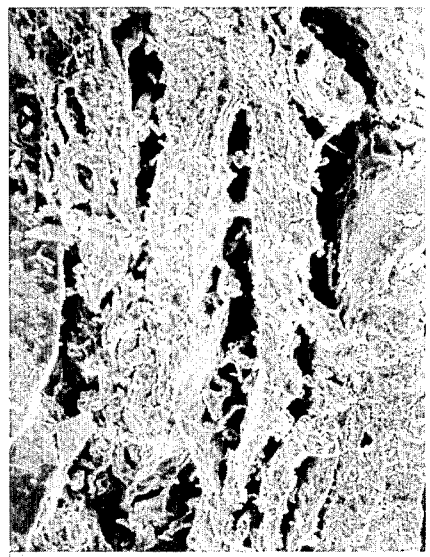
FIG. 6 represents a series of photomicrographs of the product of the prior art extrusion cooking process; 6a is taken at 50X; 6b at 100X; 6c at 300X; 6d at 500X; 6e at 1000X; and 6f at 1500X.
Figure 6B:
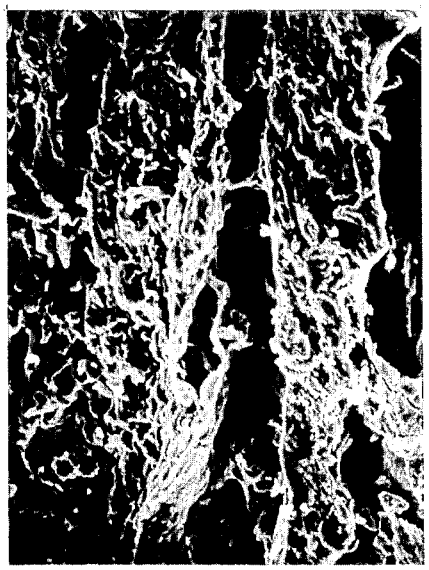
Figure 6C:
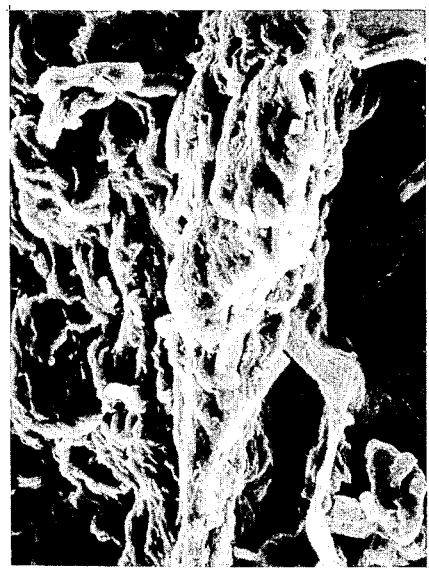
Figure 6D:
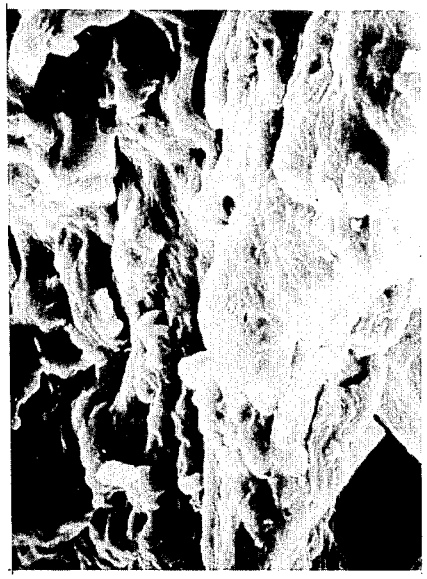
Figure 6E:
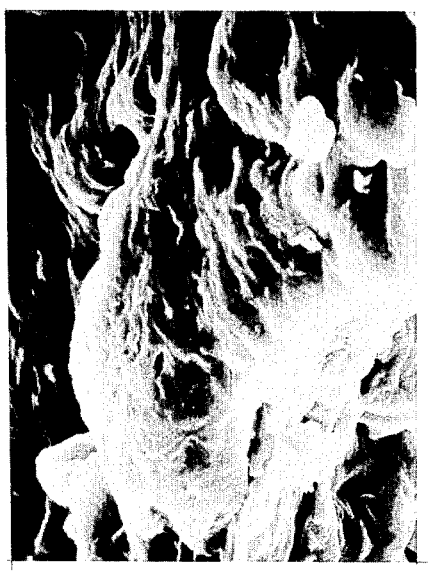
Figure 6F:

The present invention is directed to a process and apparatus for texturizing protein material. The term texturizing as used herein and widely understood in the art refers to the process of changing globular amorphous particles of protein into fibrous continuous phase protein material with structural identity.

The term retort stable as used herein refers to a product which keeps its structural integrity after treatment at elevated temperature and pressure. In the typical retort processing test about 1 part texturized protein is mixed with 10 parts of a 1% salt solution and sealed in a can. The can then is placed in a retort and subjected to a temperature of 250° F. and a pressure of 15 psig for about 60 minutes. The ability of a retorted product to maintain its structural integrity and bite characteristics can be tested by placing the product between the thumb and forefinger and subjecting the product to shear forces. A retort stable product will not disintegrate with moderate finger pressure. A product with poor retort stability will feel mushy and will fall apart when subjected to moderate shear forces.

Protein material employed in the process of the present invention should contain at least about 40% protein on a dry weight basis. Of primary interest are vegetable protein materials derived from soybean. Soy proteins can take the form of soy flour, soy concentrate, soy isolates or mixtures thereof. The process of the present invention is especially well suited to texturizing low protein materials such as soy flour. Other oilseed materials such as peanut, cottonseed, and sesame seed may also be employed. Other known protein materials such as those derived from wheat, milk, egg, single cell or leaf proteins and the like may be texturized according to the process of the present invention. Protein material employed should be viable, i.e. have a PDI (Protein Dispersability Index) in the range of from about 40 to about 90%.

Other protein sources suitable for the practice of the present invention include natural meat products. When texturizing meat proteins, the starting material employed should consist of a mixture of meat and a protein binder. Meat proteins may comprise meat scraps or pieces possessing poor textural qualities such as mechanically deboned chicken, beef, seafood, etc. or blends of the foregoing. Suitable protein binders include vegetable proteins such as soy protein or other known proteins such as those derived from wheat, yeast, milk, egg, etc. In general, mixtures containing up to about 80% comminuted meat may be texturized according to the process of the present invention.

In accordance with the preferred embodiment of the process of the present invention the protein material described above is first mixed with water to form a protein dough or paste containing from about 60 to about 73% solids. This pasty or dough-like mixture then is advanced in a passive screw feeding means. In this feed zone the product may be preheated to a relatively low temperature in the range of about 110° up to about 150° F. It will be recognized that this is a temperature below which texturization will occur. The screw feed should be of the low work type which serves mainly to advance the protein dough rather than subjecting it to severe physical working, and typically is operated at less than 50 RPM's and preferably between about 8 to 12 RPM's.

Protein dough from the screw feed chamber then is forced under pressure through an extrusion die assembly which forms the protein into a thin sheet-like product. Applicants have found that an extruded protein product will possess better overall textural qualities if a unidirectional laminar texturization is imparted to both surfaces of the protein sheet while it is still in the die assembly. Surface texturization of the protein sheet while it is still in the die assembly has been found to build in certain unique textural characteristics to the protein structure such as retort stability, greater density and firmer bite identity.

Surface texturization as used herein is accomplished by applying external heat to both surfaces of the thin protein sheet as it passes through the die assembly. As the protein sheet passes through the die, it should contact the heated die surfaces for a time sufficient to texturize the surfaces of the protein sheet. The residence time in the die can be controlled by varying the product feed rate and/or by increasing the length of the die assembly. Generally, residence times of from about 0.3 minutes up to about 1 minute or more are satisfactory to achieve the requisite degree of surface texturization. The preferred residence time is about 0.5 minutes. The upper limit on die residence time should be less than the time at which thermal degradation begins. Die lengths of 6 inches or more have been satisfactorily employed in the process of the present invention.

The protein sheet formed in the die should be relatively thin to achieve the overall enhanced properties of the present invention. Satisfactory results have been achieved with sheet thickness of up to about ½ inch. The preferred sheet thickness is about 3/16 inch. The sheet thickness should not be so great as to have a significant adverse effect on the final product.

As used herein, the term "sheet" is intended to include (1) a flat product with length and width dimensions much greater than its thickness, like a sheet of paper, and (2) a product in which a sheet as defined above is not all in one plane, e.g., a tubular sheet formed from a flat sheet as in (1). When referring to "both" sides or surfaces of a tubular sheet, the inner and outer surfaces are intended.

In the preferred embodiment the die assembly produces a thin tubular sheet of protein. The term "tubular" as used throughout the specification and claims refers to shapes other than cylindrical tubes, such as square or triangular tubes. In the preferred embodiment, however, the tubular extrudate forms a right circular cylinder of protein dough.

Extrusion pressures developed at the orifice in the range of about 1000 to about 1400 psi are suitable in the practice of the present invention. The temperatures developed at the extrusion die are generally in the range of from about 150° to about 320° F.

The thin protein sheet having the above described textured surface is extruded directly into a confined treating zone. In this treating zone, the protein texturization is completed by the action of heat and pressure from a flowing gaseous steam. This further texturization is accomplished by directing a heated gaseous stream at the thin protein sheet as it enters the confined zone. The gaseous stream is directed at the protein sheet in such a way as to cause shear forces to develop in the sheet whereby a leading segment of the continuous sheet is broken off and passes through the remainder of the confined treating zone. The forces necessary to break off any given segment of the sheet may vary with the degree of turbulence and other factors, and therefore, the continuous extruded sheet is sheared off by the gas stream into segments of varying lengths.

The surface texture built into the protein sheet in the die assembly also plays an important role in this gas shearing step. Since surface texturization greatly strengthens the sheet product, greater shear forces are needed to break off the leading segment. As a result of the time it takes for these forces to develop, the intact extruded sheet is retained in the flowing stream of heated gas in the confined zone for an extended period of time, e.g. for up to a minute or more. During this period before the protein segment is sheared off, the flowing gas is extremely effective to impart textured qualities to the protein product. Moreover, this holding period allows a high degree of texturization to be achieved without employing an extremely long confined treating zone.

When the thin extruded sheet of protein is tubular in shape, it is preferred to longitudinally slit the tube into a plurality of individual arcuate sheets as the tube leaves the die assembly. Each of these arcuate sheets then is subjected to the gas flow and broken off in the manner described above.

In the preferred embodiment the gaseous medium is high pressure steam. Generally, any steam pressure high enough to shear off a portion of protein sheet may be employed. In practice, it has been found that pressures of about 80 to 150 psi are suitable to accomplish this result. Best results are achieved when employing pressures in the range of from about 110 to about 120 psi.

Any manner of steam injection which results in an impinging flow of steam at the surface of the protein sheets may be utilized. Preferably, the steam is injected coaxially into the tubular sheet.

After the discrete segments of textured protein break off from the semi-rigid sheet, the gas stream propels the segments through the confined treating zone. In this confined treating zone the elevated temperature, pressure and turbulence of the gas flow imparts further texture to the protein pieces and volatilizes objectionable flavor compounds. Generally, temperatures in this confined treatment zone of up to about 350° F. are suitable to achieve texturization with best results achieved in the range of 310° to 350° F. Pressure in the confined treatment zone is regulated by a back pressure maintaining means at the discharge end of the confined zone. Back pressures of up to about 100 psi measured at the exit port, should be maintained in the zone. Preferably, the back pressure is kept in the range of 60 to 80 psi. After passing through the back pressure maintaining means the protein segments can be recovered in any known manner.

One embodiment of the apparatus of the present invention now will be described by reference to FIG. 1. A mixture of protein to be texturized and water is formed in any suitable mixing means (not shown). The dough-like mixture from the mixing means is discharged into a screw feed chamber 2. The screw feed chamber may be unheated over most of its length and serves only to forward the dough to the extrusion die. As the protein dough nears the extrusion die some external heat may be applied by steam or hot water jackets 3 or the like.

Communicating with the screw feed chamber is an elongated die assembly 4 which is effective to extrude a continuous thin sheet of semi-rigid protein dough. The die assembly of the preferred embodiment comprises two concentrically disposed cylindrical surfaces defining a tubular extrusion orifice. The product produced by such a die assembly is a continuous tube of protein material. As indicated above, the preferred shape of the extrusion orifice defined by the die assembly is a right circular cylinder, although other shapes may be employed.

In order to achieve a product with high textural qualities the die assembly should be equipped with provision for supplying external heat to both sides of the protein sheet. This externally supplied heat can take the form of steam jackets 5. When the extrudate is a tubular sheet, heat must be applied to both the inner and outer surface. The requisite degree of texturization is not achieved when only one side of the sheet is heated.

As the thin tubular leaves the die assembly, it is longitudinally sliced into a plurality of continuous arcuate sheets by slitting means 6, as best shown in FIG. 2.

Communicating with the die/slitter assembly is a confined treating zone 7. As the protein sheets enter this treating zone, a stream of heated gas is directed at them by an injection means. This preferably is accomplished by the use of a coaxial steam supply line 8 which delivers high pressure steam to the inside of the tubular sheet.

In the confined treating zone 7 the protein material is subjected to the action of heat and pressure from the turbulent gas flow. Preferably, this confined treatment zone takes the form of an elongated tube or chamber. The dimensions of this tube are not critical. In practice, tube lengths of about eight to ten feet generally provide suitable retention times although longer or shorter tubes may be employed satisfactorily.

At the discharge end of the confined treating zone is a back pressure maintaining means 9. This back pressure means can comprise, for example, a spring loaded valve, a rotary valve, or a rotary letdown pump. In general, any device which allows the product to exit the confined zone while maintaining a back pressure upstream may be employed. Suitable back pressure devices in the rotary letdown pump category include the CP-6 made by Creamery Package Co., Inc., and the Model R2-4PB Foster Food Pump made by Foster Pump Works, Inc. The product issuing from the back pressure valve may be subjected to recovery by any known means. Since the product is essentially dry, it is only necessary to forward the steam/protein mixture to a zone where the steam can be vented off.

The product produced by the process of the present invention comprises sheet-like segments of protein material having structural and eating properties similar to animal meats products.

This product consists of two discrete regions. A cross section of a portion of the extruded protein sheet of the present invention is shown in the photomicrograph of FIG. 3. At the surface of the sheet, shown at the right of the picture, is a layer of dense fibrous protein material oriented in one direction. This surface orientation is achieved by the special surface texturizing performed in the extrusion die according to the present invention. The interior portion of the sheet-like product of the present invention is a dense protein matrix containing an open spherical cell development.

The interior porous structure of this product is best shown in the series of photomicrographs in FIG. 4. This unique system of spherical voids surrounded by a dense fibrous matrix provides randomly spaced shear points which give way upon chewing to provide bite and mouth feel characteristics which simulate natural meat products.

The laminar surface texturization of the product of the present invention is best shown in the series of photomicrographs which make up FIG. 5. This dense fibrous skin is formed on both sides of the product where the sheet touches the heated die surfaces.

By way of contrast, the product produced by the prior art extrusion cooking process described above is shown in FIG. 6. This product exhibits a structure comprising layers of protein separated by an elongated oval void system. Note also that the matrix is not very dense.

Furthermore, the product of the present invention is free from objectionable flavor notes which in themselves often made prior art products unacceptable to humans. The severe working, temperature, and pressure conditions present in the prior art extrusion cooking processes are believed to generate certain off flavors not produced in the relatively passive treatment of the present invention.

The severe conditions of the prior art processes are also believed to adversely affect the color and nutritional value of the finished product. The product produced according to the present invention possesses excellent color and nutritional stability. Another advantage achieved by the process and apparatus of the present invention lies in the retort stability of the product. Due to the unique structure imparted by the combination of surface texturizing in the die followed by steam texturizing in the confined zone, the protein product formed in accordance with this invention may be processed by conventional food preparation techniques without thermal degradation of its physical or organoleptic properties.

Products produced by the process of the present invention find utility in a number of food processing fields. These texturized protein products may be cut into portions suitable for direct incorporation into canned or frozen foods. The texturized product may also be employed as a filter or extender in ground meat products. It is also possible to produce fabricated nutrients from the protein material produced according to the present invention.

The process of the present invention is also useful to provide upgraded or restructed natural meat products. Meat scraps or by-products with little or no food value (due to their poor structural characteristics) can be texturized according to the process of the present invention to provide chicken, crabmeat, etc. cubes with good texture and mouth feel.

The following specific examples are intended to illustrate more fully the nature of the present invention without acting as a limitation on its scope.

EXAMPLE 1

A textured soy protein material is produced according to the present invention from soy flour. The starting material, Soy Flour 200W (a soy flour produced by Central Soya, Inc. having about 50% protein) is mixed with water to form a dough-like mixture having about 70% solids. This dough-like material is texturized in the apparatus shown in FIG. 1, except that a longitudinal slitter was not employed.

The extruder (screw feeding means) is a Defrancisci Model L.A.B 2VSM. The die is a Cannelloni die which has been modified by providing for steam injection in the center area, and by lengthening the die to 6 inches. The die forms a continuous tubular sheet of protein which is about 1 3/16 inches ID and 3/16 inch thick. Surrounding the die is a concentric steam jacket. The steam supply to the center of the die is 110 to 115 psi. From the die the product is extruded into a 7 feet long cooking tube which is 2 inches in diameter and equipped with a Model C-P 6 rotary letdown pump made by Creamery Package Co., Inc. The back pressure in the cooking tube is 76 to 84 psi and the cooking tube temperature is about 315° to 330° F. The product recovered from the back pressure pump varies from small pieces to sheets approximately 3×8 inches. This product is collected and dried and then subjected to retort processing. The retorted product exhibits excellent texture and mouth feel properties and has good clean odor and flavor.

EXAMPLE 2

A textured soy protein material is produced from a 70% solids dough of soy flour as in Example 1, except that the longitudinal slitting means shown in FIG. 2 are employed. The extruder drive is run at 8 RPM and the extrusion pressure, at the die, is 1100±50 psi. The steam supply is 110 psi and a back pressure of 70±5 psi and a temperature of 310° F. are maintained in the cooking tube. The product, similar to that produced in Example 1, exhibits excellent textural characteristics.

EXAMPLE 3

This example demonstrates the importance of applying external heat to the protein as it is being extruded to impart surface texturization to the extruded product. The apparatus of FIG. 1 is modified by employing an unheated die and supplying the cooking tube steam from a T after the die rather than coaxially within the die. In other respects, the starting materials and process parameters are as in Example 1. The product produced does not have the characteristic texturized skin of the product of the present invention. Although this product appears to have satisfactory texture as produced, upon retort processing the product completely loses its texture and has no integrity when handled. The retorted product appears to have more gel properties than textured properties.

While certain specific embodiments of the invention have been described with particularity herein, it should be recognized that various modifications thereof will occur to those skilled in the art. Therefore, the scope of the invention is to be limited solely by the scope of the claims appended hereto.

We claim:
1. Apparatus for texturizing protein material comprising:
   (a) die means for extruding a continuous, relatively thin sheet of semi-rigid protein material;
   (b) means for externally applying heat to both surfaces of said thin sheet as it passes through said die means to effect surface texturization of said thin sheet;
   (c) means defining a confined treating zone communicating with said die means;
   (d) means for directing a heated gaseous stream at said extruded thin sheet as it enters said confined zone to break off the leading segment of said extruded sheet; and
   (e) means for recovering said texturized protein material.

2. The apparatus of claim 1 additionally comprising low-work screw feed means communicating with said die means.

3. The apparatus of claim 1 wherein said die means defines a a tubular shaped orifice, said apparatus further comprising means for longitudinally slitting an extruded tubular sheet into a plurality of continuous arcuate sheets, said slitting means disposed at the entrance to said confined zone.

4. The apparatus of claim 3 wherein said die means comprises two concentric cylindrical shaped surfaces defining a right circular cylindrical orifice.

5. The apparatus of claim 4 wherein said means for directing a heated gaseous stream is coaxially disposed within said die means.

6. The apparatus of claim 1 additionally comprising back pressure maintaining means disposed at the discharge end of said confined zone.

7. Apparatus for texturizing protein material comprising:
   (a) means for mixing a source of protein and water to form a protein dough;
   (b) means for advancing said dough without imparting excessive work to said dough;
   (c) die means for extruding said dough in the form of a continuous relatively thin sheet of semi-rigid protein material;
   (d) means for externally applying heat to both surfaces of said thin sheet as it passes through said die means to effect surface texturization of said thin sheet;
   (e) means defining a confined treating zone communicating with said die means;
   (f) means for directing a heated gaseous stream at said thin sheet of protein material as it enters said confined zone to break off the leading segment of said extruded sheet;
   (g) back pressure maintaining means disposed at the discharge end of said confined zone, said back pressure means maintaining a predetermined back pressure in said confined zone; and
   (h) means for recovering said texturized protein material.

8. The apparatus of claim 7 wherein said advancing means comprises a low-work screw feeder.

9. The apparatus of claim 7 wherein said die means defines a tubular shaped orifice, said apparatus further comprising means for longitudinally slitting an extruded tubular sheet into a plurality of continuous arcuate sheets, said slitting means disposed at the entrance to said confined zone.

10. The apparatus of claim 9 wherein said die means comprises two concentric cylindrical shaped surfaces defining a right circular cylindrical orifice.

11. The apparatus of claim 10 wherein said means for directing a heated gaseous stream is coaxially disposed within said die means.

* * * * *

UNITED STATES PATENT AND TRADEMARK OFFICE
CERTIFICATE OF CORRECTION

PATENT NO. : 4,175,486
DATED : November 27, 1979
INVENTOR(S) : William M. Hildebolt and Murray T. Hundt It is certified that error appears in the above-identified patent and that said Letters Patent are hereby corrected as shown below:

Column 7, line 9, after "tubular" insert -- sheet --.

line 45, "meats" should read -- meat --.

Column 8, line 33, "filter" should read -- filler --.

line 38, "restructed" should read -- restructured --.

Signed and Sealed this

Twenty-sixth Day of February 1980

[SEAL]

Attest:

SIDNEY A. DIAMOND

Attesting Officer

Commissioner of Patents and Trademarks